US009948595B2

United States Patent
Stolorz et al.

(10) Patent No.: US 9,948,595 B2
(45) Date of Patent: Apr. 17, 2018

(54) METHODS AND APPARATUS FOR INSERTING CONTENT INTO CONVERSATIONS IN ON-LINE AND DIGITAL ENVIRONMENTS

(71) Applicant: GENESYS TELECOMMUNICATIONS LABORATORIES, INC., Daly City, CA (US)

(72) Inventors: Paul Ernest Stolorz, Los Altos, CA (US); Christopher T. Dean, Montara, CA (US); Jeffrey Eric Davitz, Danville, CA (US); Jackie Kellon Smith, II, Pelham, NY (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

(21) Appl. No.: 15/458,683

(22) Filed: Mar. 14, 2017

(65) Prior Publication Data
US 2017/0187670 A1 Jun. 29, 2017

Related U.S. Application Data

(63) Continuation of application No. 14/313,981, filed on Jun. 24, 2014, now Pat. No. 9,621,624, which is a
(Continued)

(51) Int. Cl.
G06F 15/16 (2006.01)
H04L 12/58 (2006.01)
G06F 17/30 (2006.01)

(52) U.S. Cl.
CPC ........ *H04L 51/32* (2013.01); *G06F 17/30029* (2013.01); *G06F 17/30876* (2013.01)

(58) Field of Classification Search
CPC ............... H04L 51/32; G06F 17/30029; G06F 17/30876
(Continued)

(56) References Cited

U.S. PATENT DOCUMENTS

| 6,393,460 B1 | 5/2002 | Gruen et al. |
| 7,231,343 B1 | 6/2007 | Treadgold et al. |

(Continued)

FOREIGN PATENT DOCUMENTS

| KR | 100506017 B1 | 8/2005 |
| KR | 101130964 B1 | 4/2012 |

(Continued)

OTHER PUBLICATIONS

Anderson, Kenneth M. et al., "Templates and Queries in Contextual Hypermedia", Proc. 17th Conf. Hypertext and Hypermedia, pp. 99-110, Aug. 22-25, 2006, Odense, Denmark.
(Continued)

*Primary Examiner* — Kristie Shingles
(74) *Attorney, Agent, or Firm* — Lewis Roca Rothgerber Christie LLP

(57) ABSTRACT

Content is inserted into conversations hosted on a takeoff site using creatives that provide lures and links to other material that users engaged in the conversation might find helpful and relevant. Such insertions are made in a contextually meaningful fashion through the use of a matching and decision process that determines best candidate creatives and an appropriate time and place for their insertion into the conversation.

20 Claims, 4 Drawing Sheets

Related U.S. Application Data continuation of application No. 13/598,261, filed on Aug. 29, 2012, now Pat. No. 8,782,155, which is a continuation of application No. 13/040,092, filed on Mar. 3, 2011, now Pat. No. 8,271,583, which is a continuation of application No. 12/851,489, filed on Aug. 5, 2010, now Pat. No. 7,921,156.

(58) Field of Classification Search
USPC ........................................................ 709/206
See application file for complete search history.

(56) References Cited

U.S. PATENT DOCUMENTS

| | | | |
|---|---|---|---|
| 7,428,504 B2 | 9/2008 | Song | |
| 7,478,089 B2 | 1/2009 | Henkin et al. | |
| 7,483,910 B2 | 1/2009 | Beyer et al. | |
| 7,523,087 B1 | 4/2009 | Agarwal et al. | |
| 7,555,722 B2 | 6/2009 | Karatal et al. | |
| 7,668,922 B2 | 2/2010 | Garbow et al. | |
| 7,680,882 B2 | 3/2010 | Tiu, Jr. et al. | |
| 7,702,798 B2 | 4/2010 | Apreutesei et al. | |
| 7,725,435 B1 | 5/2010 | Li et al. | |
| 7,730,021 B1 | 6/2010 | Morse et al. | |
| 7,739,594 B2 | 6/2010 | Vasilik | |
| 7,752,074 B2 | 7/2010 | Bosarge et al. | |
| 7,756,926 B2 | 7/2010 | Tseng et al. | |
| 7,769,764 B2 | 8/2010 | Ramer et al. | |
| 7,908,238 B1 | 3/2011 | Nolet et al. | |
| 7,921,156 B1 | 4/2011 | Stolorz et al. | |
| 7,996,210 B2 | 8/2011 | Godbole et al. | |
| 8,121,618 B2 | 2/2012 | Rhoads et al. | |
| 8,271,583 B2 | 9/2012 | Stolorz et al. | |
| 8,359,234 B2 | 1/2013 | Vieri | |
| 8,374,636 B2 | 2/2013 | McDonough | |
| 8,484,083 B2 | 7/2013 | Basu et al. | |
| 8,521,818 B2 | 8/2013 | McGann et al. | |
| 8,782,155 B2 | 7/2014 | Stolorz et al. | |
| 2002/0156693 A1 | 10/2002 | Stewart et al. | |
| 2003/0033199 A1 | 2/2003 | Coleman | |
| 2004/0059712 A1 | 3/2004 | Dean et al. | |
| 2004/0111479 A1 | 6/2004 | Borden et al. | |
| 2005/0256905 A1 | 11/2005 | Gruhl et al. | |
| 2005/0262428 A1 | 11/2005 | Little et al. | |
| 2006/0095502 A1 | 5/2006 | Lewis et al. | |
| 2006/0256937 A1 | 11/2006 | Foreman et al. | |
| 2006/0259473 A1 | 11/2006 | Li et al. | |
| 2006/0282328 A1 | 12/2006 | Gerace et al. | |
| 2006/0293949 A1* | 12/2006 | Grossnickle | G06Q 30/02 705/14.61 |
| 2007/0118801 A1 | 5/2007 | Harshbarger et al. | |
| 2007/0140451 A1 | 6/2007 | Altberg et al. | |
| 2007/0168465 A1 | 7/2007 | Toppenberg et al. | |
| 2007/0174118 A1 | 7/2007 | Dekel et al. | |
| 2007/0214097 A1 | 9/2007 | Parsons et al. | |
| 2007/0244748 A1 | 10/2007 | Smith et al. | |
| 2007/0271145 A1* | 11/2007 | Vest | G06Q 30/02 705/14.41 |
| 2008/0040318 A1 | 2/2008 | Stanis et al. | |
| 2008/0052140 A1 | 2/2008 | Neal et al. | |
| 2008/0055504 A1 | 3/2008 | Choi et al. | |
| 2008/0059153 A1 | 3/2008 | Bennett | |
| 2008/0189169 A1 | 8/2008 | Turpin et al. | |
| 2008/0201434 A1 | 8/2008 | Holmes et al. | |
| 2008/0214148 A1 | 9/2008 | Ramer et al. | |
| 2008/0243797 A1 | 10/2008 | Song et al. | |
| 2008/0263460 A1 | 10/2008 | Altberg et al. | |
| 2008/0306899 A1 | 12/2008 | Gregory et al. | |
| 2008/0306913 A1 | 12/2008 | Newman et al. | |
| 2009/0006206 A1 | 1/2009 | Groe et al. | |
| 2009/0076917 A1 | 3/2009 | Jablokov et al. | |
| 2009/0150214 A1 | 6/2009 | Mohan | |
| 2009/0150397 A1 | 6/2009 | Chen et al. | |
| 2009/0204883 A1 | 8/2009 | Talanis et al. | |
| 2009/0210806 A1 | 8/2009 | Dodson et al. | |
| 2009/0222341 A1 | 9/2009 | Belwadi et al. | |
| 2009/0235150 A1 | 9/2009 | Berry | |
| 2009/0248672 A1 | 10/2009 | McIntire et al. | |
| 2009/0319379 A1 | 12/2009 | Joao | |
| 2010/0042635 A1 | 2/2010 | Venkataramanujam | |
| 2010/0088182 A1 | 4/2010 | Ryder et al. | |
| 2010/0115615 A1 | 5/2010 | Hubbard et al. | |
| 2010/0119053 A1 | 5/2010 | Goeldi | |
| 2010/0153284 A1 | 6/2010 | Hoag et al. | |
| 2010/0159883 A1 | 6/2010 | Pascal et al. | |
| 2010/0191811 A1 | 7/2010 | Yang et al. | |
| 2011/0098056 A1 | 4/2011 | Rhoads et al. | |
| 2011/0119139 A1 | 5/2011 | Dean et al. | |
| 2011/0153414 A1 | 6/2011 | Elvekrog et al. | |
| 2011/0161076 A1 | 6/2011 | Davis et al. | |
| 2011/0196751 A1* | 8/2011 | Steelberg | G06Q 20/123 705/14.73 |
| 2011/0231242 A1* | 9/2011 | Dilling | G06Q 30/02 705/14.42 |
| 2011/0246910 A1 | 10/2011 | Moxley et al. | |
| 2012/0036015 A1 | 2/2012 | Sheikh | |
| 2012/0042025 A1 | 2/2012 | Jamison et al. | |
| 2012/0209919 A1 | 8/2012 | Shah et al. | |
| 2012/0265819 A1 | 10/2012 | McGann et al. | |
| 2012/0278159 A1 | 11/2012 | Kumar et al. | |
| 2012/0324016 A1 | 12/2012 | Stolorz et al. | |
| 2013/0073336 A1 | 3/2013 | Heath | |
| 2013/0103667 A1 | 4/2013 | Minh | |
| 2013/0325992 A1 | 12/2013 | McGann et al. | |
| 2014/0025496 A1 | 1/2014 | Davitz et al. | |
| 2014/0108143 A1 | 4/2014 | Davitz et al. | |
| 2014/0310340 A1 | 10/2014 | Stolorz et al. | |

FOREIGN PATENT DOCUMENTS

| | | |
|---|---|---|
| WO | 2015023546 A1 | 2/2015 |
| WO | 2015042482 A1 | 3/2015 |

OTHER PUBLICATIONS

Brusilovsky, Peter, "Adaptive Hypermedia", User Modeling and User-Adapted Interaction, vol. 11:pp. 87-110, 2001.
European Supplementary Search Report for EP Application No. 14835919.3, dated May 17, 2016, 6 pages.
Hansen, Klaus Marius et al.,"Instant Collaboration: Using Context-Aware Instant Messaging for Session Management in Distributed Collaboration Tools", Proc. 2nd Nordic Conf. Human-Computer Interaction, vol. 31, pp. 279-282, Oct. 2002, Arhus, Denmark.
International Search Report and Written Opinion for PCT/US2014/050448, dated Nov. 26, 2014, 10 pages.
International Search Report and Written Opinion for PCT/US2014/056680, dated Dec. 23, 2014, 12 pages.

* cited by examiner

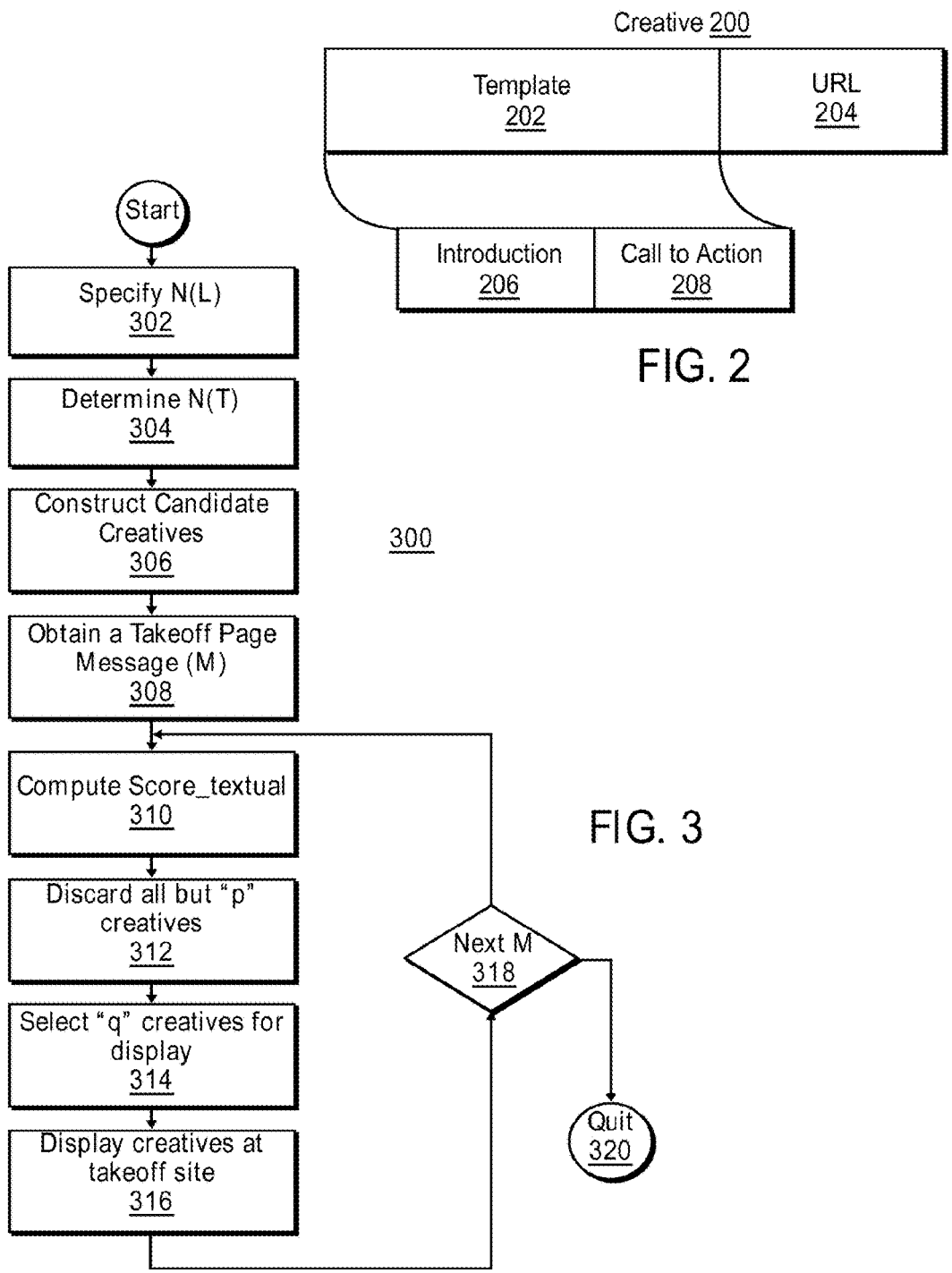

METHODS AND APPARATUS FOR INSERTING CONTENT INTO CONVERSATIONS IN ON-LINE AND DIGITAL ENVIRONMENTS

CROSS-REFERENCE TO RELATED APPLICATIONS

This application is a continuation of U.S. patent application Ser. No. 14/313,981, filed on Jun. 24, 2014, which is a continuation of U.S. patent application Ser. No. 13/598,261, filed on Aug. 29, 2012, now U.S. Pat. No. 8,782,155, which is a continuation of U.S. patent application Ser. No. 13/040,092, filed on Mar. 3, 2011, now U.S. Pat. No. 8,271,583, which is a continuation of U.S. patent application Ser. No. 12/851,489, filed on Aug. 5, 2010, now U.S. Pat. No. 7,921,156, the disclosures of which are hereby incorporated by reference in their entireties.

FIELD OF THE INVENTION

The present invention relates to methods and systems for inserting appropriate links into an ongoing conversation, which links point to other material or people that users engaged in the conversation might find helpful and relevant to the conversation.

BACKGROUND

The World Wide Web (WWW) or simply, the "Web" is the well-known collection of interlinked hypertext documents hosted at a vast number of computer resources ("hosts") communicatively coupled to one another over networks of computer networks known as the Internet. These documents, which may include text, multimedia files and images, are typically viewed as web pages with the aid of a web browser—a software application running on a user's computer system. Collections of related web pages that can be addressed relative to a common uniform resource locator (URL) are known as websites, and are typically hosted on one or more web servers accessible via the Internet.

In recent years, websites featuring user-generated content (UGC), that is content created and posted to websites by end-users, have become increasingly popular. UGC accounts for a wide variety of content, including news, gossip, audio-video productions, photography and social commentary, to name but a few. Content of this sort may be presented in any of a variety of forms, including web logs (blogs), comments regarding website editor-created content (e.g., user reviews of products being offered for sale at a website), status updates on social networking sites and question and answer databases commonly known as forums.

Advertisers were quick to recognize the potential power of the Web as it concerns access to potential consumers of goods and services. Models for capitalizing on the insertion of advertisements into websites quickly sprang up. Such advertisements came in various forms, including banner ads, which appear across portions of a web page, and sponsored links, which typically appear in designated sections of search result pages. However, many Web users find such advertisements to be annoying, in that they are often placed in locations of a web page that interrupt the user's reading or interaction with content on the page, contextually irrelevant, and/or otherwise disruptive of the web browsing experience. The situation is compounded when dealing with websites featuring UGC because contributors to such sites often have a low tolerance for advertisements on the sites that are perceived as not relevant to the content. At the same time, advertising is one of the primary ways in which website operators offset the cost of producing content and otherwise maintaining websites.

SUMMARY OF THE INVENTION

In various embodiments, the present invention provides methods and systems for inserting content into a takeoff page hosted on a takeoff site. The content (referred to as creatives) provide links deemed to be appropriate, contextually and/or otherwise, for insertion in conjunction with a message hosted at the takeoff page. The message may be a constituent of a broader conversation hosted at the takeoff page and the links included in the creatives may point to material that users engaged in the conversation might, hopefully will, find helpful and/or relevant to the conversation.

The present process may make use of a matching engine, typically hosted on a server other than that hosting the takeoff site. The matching engine is configured to construct a set of candidate creatives. That is, for each of a plurality of landing sites and templates consisting of some combination of text, audio and/or visual elements, and on the basis of similarities between content on the takeoff page, content on respective landing pages of the landing sites, and content of each respective one of the templates, the matching engine creates a pool of candidate landing pages and candidate templates for the takeoff page. Then, a set of candidate creatives are created by combining URLs of the candidate landing pages with the candidate templates. These candidate creatives may be ranked in the context of the message on the takeoff page, and from the ranked list of the candidate creatives, a set of these creatives may be selected for display in conjunction with the conversation at the takeoff page. One or more (or in some cases none) of the selected creatives may then be delivered to the takeoff site and displayed in conjunction with the conversation at the takeoff page.

Determining which, if any, of the creatives to be displayed may include incorporating information concerning user interaction with previous instances of the candidate creatives when inserted into takeoff pages, information concerning experience with previous instances of the candidate templates, or portions thereof (each candidate template can be regarded as including one or more slots, including such elements as an introduction, a call to action and/or a photo), and/or information concerning statistics relating to the conversation on the takeoff site. Determining which, if any, of the creatives to be displayed may include accounting for campaign management requirements. Further, determining which, if any of the creatives to be displayed may include information about the devices on which the creative may be displayed. For example, screen size limit or text string length limit.

Hence, the present invention provides means for creating links between content of different modes, for example a takeoff page made up of UGC and a landing page comprised of curated content, or a takeoff page made up of curated content and a landing page comprised one of UGC, or any combination of the foregoing. These and other examples of the features and use of the present invention are described further below.

BRIEF DESCRIPTION OF THE DRAWINGS

The present invention is illustrated by way of example, and not limitation, in the figures of the accompanying drawings in which:

FIG. 2 illustrates an example of a creative for insertion in a conversation hosted at a takeoff page in accordance with embodiments of the present invention;

FIG. 3 illustrates an example of a process for creating, matching and inserting creatives within a conversation hosted at a takeoff page in accordance with embodiments of the present invention;

DETAILED DESCRIPTION

Figure 1:
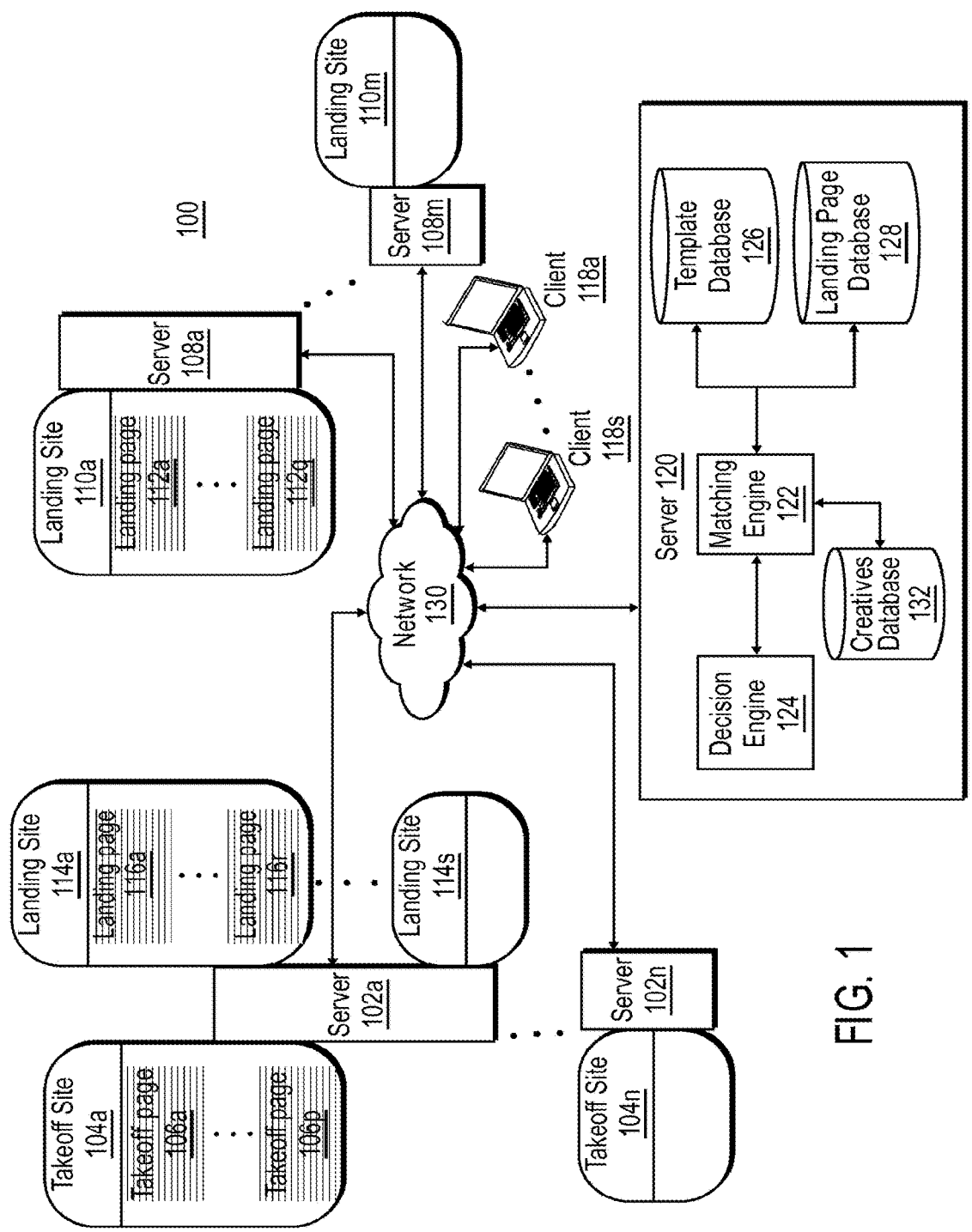
FIG. 1 illustrates components of a network in which embodiments of the present invention may be implemented.

In view of the above-described shortcomings of current Web-based advertising models, the present inventors have recognized a need for a new paradigm for inserting advertising and/or other content into websites or other venues at which UGC, and, more generally, conversational content, is hosted. Accordingly, in various embodiments the present invention provides methods and systems to insert advertisements or other content, usually in the form of sounds, pictures, text, and/or hyperlinks ("links") or other direction-aiding materials, into an ongoing conversation (often instantiated in the form of UGC hosted on a social media or other website, but may also include other forms of conversations, such as instant message (IM) or similar conversations, Twitter™ tweets, social network page commentary, e-mail threads, forum-hosted discussion boards, etc., some of which may be instantiated within the confines of a particular software application instead of or in addition to being posted at one or more websites), which point to other material (e.g., material accessible via a URL) that users (e.g., participants in the ongoing conversation or others that are monitoring the conversation) might find helpful and relevant to the subject conversation. The paradigm is thus one of a conversational aid, rather than a mere mechanism for inserting advertising.

By analyzing the contents of sites such as web pages, forums and other forms of social media, systems configured in accordance with the present invention are able to insert links and associated text at appropriate points, directing users to other online material that may be helpful to them. To maximize the relevance of these suggestions to users, these systems are preferably designed to detect and respond to important conversational indicators, such as particular types of speech act expressed within an online posting. The systems envisage the ability to detect speech acts at a general level, incorporating a taxonomy of utterances that can be categorized according to factors such as their purpose, their expressed psychological state (sentiment), and their propositional content. Typical taxonomies include categories such as assertives: The Sky is Blue, directives: Can you tell me the way to San Jose?, and expressives: I'm feeling very badly about that. By matching the type of speech act presented by an author against the content from a set of potential recommended links, the present systems can select and display those whose tenor, tone and meaning are most relevant to the authored utterance. For example, a query directive could be linked to content that provides either a direct answer to the question being asked, or to other material that may be helpful. An expression of sadness could be linked to content that acknowledges the author's emotion.

In one example of a system configured in accordance with the present invention, the system includes a component that focuses on the detection of queries within a stream of textual content. There are, broadly speaking, two types of queries:

explicit queries—in which the author poses a specific question that requests a response from the reader(s), either in the form of a piece of information or a yes/no answer: Who is buried in Grant's Tomb?

implicit queries—in which the author makes a statement that implicitly asks for help and/or information from readers: If only I had a way to fix problem X with my bike.

The present system uses a form of supervised learning, in which a corpus of utterances manually labeled as queries is provided as a training set, along with a set of utterances labeled as non-queries.

The first task of this system is to assess which textual features are important for distinguishing between queries and non-queries. This is accomplished by first analyzing the training corpus mentioned above and extracting every unigram, bi-gram and tri-gram. Tokens used in the n-gram analysis include all words and all punctuation in the corpus utterances. Next, the system calculates the mutual information between the occurrence of a selected n-gram within an utterance and whether the utterance is a query or a non-query. The mutual information is a standard measure of the "correlation" between two variables.

For a given n-gram, we define the following two binary variables:

x=n-gram occurs in a given utterance (x=1 if it occurs, x=0 if it does not)

y=utterance is a query (y=1 if the utterance is a query, y=0 if it is not)

We also define $p(x,y)$ as the probability across all utterances in the training corpus that the selected n-gram occurs in an utterance and that the utterance is a query. Similarly, we define $p1(x)$ and $p1(y)$ as the respective marginal distributions of $p(x,y)$. These distributions are all straightforward to compute from the training corpus. The Mutual Information is then given by $$MI=\text{Sum}\_x,y p(x,y) \log [p(x,y)/p1(x)*p1(y)]$$

Having computed the mutual information for each possible n-gram across the training corpus, the system now ranks each n-gram according to its mutual information measure. Table 1 below shows an example of such a ranking, from a fictitious corpus.

TABLE 1

Example of Ranking of n-grams according to Mutual Information Measure

| Unigrams | MI | Bi-grams | MI | Tri-grams | MI |
|---|---|---|---|---|---|
| ? | 0.95 | Aren't you | 0.98 | Could you please | 0.91 |
| have | 0.93 | Sick of | 0.97 | How can I | 0.90 |
| you | 0.91 | Microsoft word | 0.95 | If I put | 0.75 |
| any | 0.82 | Autocaps yes | 0.88 | Where can you | 0.62 |
| ham | 0.81 | I am | 0.85 | What on earth | 0.61 |

Feature selection is now finalized by selecting a threshold, or set of thresholds, for the mutual information, below which the n-gram in question is ignored. In the above fictitious corpus, for example, the unigram "?" is very highly correlated with an utterance being a classified as a query, and so is retained as an important feature.

After selecting a set of important n-gram features, the system is trained by presenting the known training exemplars of query and non-query utterances to a binary support vector machine. The resulting predictive classifier is then used, as necessary, to predict the classification of any previously unseen utterance as either query or non-query. A variant of the above approach, in which groups of selected tokens are collapsed and treated as a single mega-token, e.g. pronoun tokens (I, we, anyone, you, he, she, they) all counted as a single mega-token pronoun_subject, may also be used.

In discussing the features of the present invention, we will use the term "creative" to designate that portion of the content being inserted into the conversation which is intended for presentation to the conversation participants and/or others (i.e., intended to be viewed by them), but this should not be read as restricting the present invention solely to means for inserting commercial content. By creatives, we mean a broader construct, which includes some combination of the above-mentioned links (or other direction-aiding materials), and any text, audio and/or visual elements.

As discussed below, creatives may be defined by templates, which may include positions for introductory words or phrases, themes, calls to action, URLs of landing pages, etc. In effect, these templates define a sort of slot grammar for the creatives. This allows for variants of creatives where one or more items of the creative are fixed and the other components are iterated to form different combinations. Such sets of creatives may be referred to as a variation set.

The location(s) at which the creatives are presented (which is, generally, also the location at which the conversation is taking place) is referred to as a "takeoff site", and the location(s) to which users are directed when they click on one of the links (or follow the direction-aiding materials) is referred to as a "landing site", but this should not be read as restricting the present invention solely to websites. In the context of takeoff and landing sites, the term site is intended to encompass, respectively, any environment where conversations may occur and any environment to which the conversation participants (or others reading the conversation) might be directed.

Takeoff sites include takeoff pages, at which individual conversations, or portions thereof, may be displayed, instantiated or presented. Landing sites include landing pages, at which the content deemed to be of interest to the conversation participants (or others reading the conversation) may be hosted or otherwise made accessible. Thus, while a takeoff site is typically a social media site at which users are engaged in some sort of network-enabled social conversation with one or more other users, this need not necessarily be the case and the term may also encompass software applications in which conversations are hosted as well as IM threads, etc. Likewise, landing sites can consist of either other on-line conversations on social media sites (including, but not limited to, the same site as the takeoff site) or sites containing curated content, but may also be software applications, IM threads, etc. The aim is to enrich a user's social media experience, and also enhance the value of curated content and existing conversational threads, by providing users with natural entry points to new conversations that key off important elements of a conversation which they are already viewing or engaging in.

Creatives may be portions of larger constructs which we refer to as "payloads". A payload may include content in addition to a creative, which other content is not itself intended for display to conversation participants or others, but which may be used to direct placement of the creative within a takeoff page, to gather statistics from the takeoff page, or provide for or perform another function. For example, a payload may include computer-readable instructions or computer-interpretable tags or other information. In some instances, a creative will be the sole constituent of a payload, but this is not necessarily so.

To better understand the context in which the present methods and systems operate, consider the network 100 illustrated in FIG. 1. Included in this network are various servers 102a-102n, each hosting one or more takeoff sites 104a-104n. Each takeoff site 104 may include one or more takeoff pages 106a-106p. As mentioned above, the takeoff sites may be social media sites in which users are engaged in some sort of on-line social conversation with other users, but may be any sites at which UGC is posted (e.g., in the form of an on-line conversation). Hence, the takeoff pages may be forum pages, blogs, social network sites, chat windows, product or other review pages, etc.

Also part of network 100 are a number of servers 108a-108m, hosting landing sites 110a-110m, any or each of which may be made up of a plurality of landing pages 112a-112q. Notice that a server 102 hosting a takeoff site 104 with one or more takeoff pages 106 may also host one or more landing sites 114a-114s, any or each of which may include one ore more landing pages 116a-116r. That is, any server may host any combination of takeoff and/or landing sites. When we refer to content on a takeoff site or landing site, we mean to include content that is located on a particular takeoff page of a takeoff site or landing page of a landing site, as appropriate.

The takeoff and landing sites are accessed by users via client systems 118a-118s. The client systems may, in some cases, be computer systems, such as personal computers or the like, but more generally may be any computer-based or processor-based device that executes application software which allows the content of the takeoff/landing site to be rendered for display to the user on a display device. For example, client systems may include computer systems, mobile devices such as iPads™, smart phones, mobile phones, etc., and the application software may be web browser software such as Microsoft Corporation's Internet Explorer™, Apple Inc.'s Safari™, or Google Inc.'s Chrome™, or instant messaging software such as Apple Inc.'s iChat™, America Online Inc.'s AIM™, etc. Such applications are typically stored in one or more computer readable storage devices accessible to one or more processors of the subject client system and, when executed, cause the processor(s) to perform the operations necessary to render the subject sites/pages for display at the subject system (e.g., via a display device communicatively coupled to the processor). The various constituents of network 100 are communicatively coupled to one another via one or more computer/data networks 130, which may include the Internet and other networks coupled thereto. The precise nature of network 130 is not critical to the present invention.

Of course, network 100 also includes server 120, which hosts a matching engine 122 and a decision engine 124. The matching and decision engines together implement an embodiment of the present invention, however, in other embodiments the functions of these two engines may be combined in a single computer-implemented entity or in multiple distributed entities. Accordingly, the embodiment illustrated in FIG. 1 should be regarded as merely a convenient example for purposes of the following discussion and not as a limitation of the present invention.

Matching engine 122 is configured for the automatic detection of various features within a subject takeoff site 104, landing site 110 and creatives, respectively, that enable the creatives, when inserted into the on-line conversation present on the takeoff site, to act as attractive lures, inducing users (e.g., users associated with client systems 118a-118s) to explore (via selection of the links included in the creatives) material present on the landing site(s) that is relevant to the conversation on the takeoff site. In some cases the creatives, including their associated links to the landing sites, are the advertisements or ads referred to above.

Creatives may be fashioned using templates and, in one embodiment of the invention, a library of templates is stored in and obtained from a templates database 126, which is communicatively coupled to the matching engine. This templates database may be hosted at the same or a different server than the matching engine. A separate (or common) database 128 of landing page URLs is also maintained (either at server 120 or another server) and is likewise communicatively coupled and accessible to the matching engine 122.

Among the features which the matching engine may be configured to detect is textual similarity between text found on the takeoff site, the landing site and the templates. Of course, there are other important signals that can trigger associations in a user's mind, such as the detection of particular speech acts in the takeoff site, as noted above. For example, the detection of implicit or explicit queries can be used to trigger the presentation of a link to a landing site that either addresses the query directly or provides some helpful information to the questioner. The present system thus provides a framework for blending together multiple features in the creative selection process.

As noted above, the term speech act is intended to refer to a specific utterance on a takeoff site. The canonical example is a "question". A user can communicate that an utterance is a question by the use of a question mark. Hence, the matching engine is configured to monitor takeoff sites (takeoff pages), looking for question marks (e.g., identified by ASCII code or other means), and then examine the preceding text to determine what question is being posed. Of course there are many other ways that users express need for information in conversations. For example, in a help forum, the statement of a problem may be an implicit question, e.g., "My monitor has wavy lines." This can be regarded as a request for an explanation and help with the problem. Accordingly, the matching engine is configured to monitor and parse the content of takeoff sites looking for such problem statements. Other speech acts which the matching engine may be configured to interpret include assertions, complaints, requests for action, and so on.

Thus, creatives may be regarded as the combination of a template and a link to a landing site/page. Creatives are not, however, purely arbitrary sentences; they are designed to have a structure tailored to the context of the conversation in which they are to be inserted. As illustrated in FIG. 2, a creative 200 may be thought of as consisting of "slots", including a slot 202 for a template and another slot 204 for a URL (or other direction aiding material) to the landing site/page. The templates 202 may be made up of an introduction 206, which is indented to identify the reason and source of message, e.g., "for more information about x,y, z, . . . ", or "We at company x believe that you can get valuable sources of help at . . . "; and a call to action 208, which invites the user to do something. The minimal form of such an invitation may be to click on a link (i.e., to select a link to the landing site by executing a mouse click while the screen cursor displayed on a client system is indicating the URL portion of the creative), but the call to action can go beyond this to some form of cognitive action like learn, study, understand, see, etc.

The entries or content for each slot of a creative may be derived from background knowledge or experience of an operator or administrator of an ad-insertion service that operates server 120 (e.g., an advertising professional who might have developed certain kinds of preferred introductions for different situations) as well as content gleaned automatically from the takeoff and landing sites or related domain content (e.g., Wikipedia™ content regarding a particular subject or content from similar conversations). Concepts (or themes) are sets of words that express some fundamental meaning of the domain, e.g., when discussing automobiles, the term "sports utility vehicle" has a certain connotation, and such concepts can be entities or properties of entities, such as "SSRI side effects", or user intentions like "great value deal". The introduction will tend to be the template component that contains references to such concepts, e.g., "for information about SSRI side effects, . . . ", while the call to action will tend to reference the user cognitive action to be taken and a landing page address. Of course, template slots other than just introductions and calls to action may also be present in the templates and, if present, these too would be populated when creating the templates database. For example, a slot called "conversational reference", which can contain references to content or properties of the conversation, may be employed. Or, some templates may have two possible calls to action, e.g., "do x OR do y". The full set of creatives is, therefore, the set of all possible compositions of the elements from each of the slots.

In accordance with the present invention, the template and landing page databases 126, 128 may be populated on an on-going basis and used to formulate the creative(s). In the case of the templates database 126, this involves populating each of the introduction and call to action slots with candidates and storing the results. That is, server 120 (e.g., the matching engine or a separate template creation engine (not shown in detail)) may automatically create all possible combinations of introductions and calls to action (the product of the two) and store these combinations in template database 126. For the landing page database, a crawl, an API call or other content gathering means may be employed to populate database 128. The full inventory of possible creatives may then be created by appending all possible landing page URLs from the landing page database to each template from the template database and storing the results in a creative database 132. Creatives may be created in advance and/or real time (or quasi-real time), for example in response to a trigger.

Once the various databases have been populated (assuming they are used), the essence of the matching process is the detection of similarities (e.g., textual similarities) between three elements: 1) content on a specific takeoff page, 2) content on a specific candidate landing page, and 3) the contents of the candidate creative presented to be presented to the user on the takeoff page and pointing to the landing page.

In order to better make this point, an example may be helpful. Consider the textual content of a conversation on a takeoff site such as a forum. A single conversation generally consists of a series of individual messages contributed by a set of authors: the initial message is usually termed a "post", and is typically followed by some number of "replies". The initial post that seeds the conversation typically consists of two parts: a title, usually a single sentence or question, and a body, a narrative that follows the post title. The replies typically only consist of narrative entries, with no title.

The matching engine 122 fetches and stores (in a message store 130) the contents of a given message M (either the initial post or one of its replies) upon encountering it for the first time. It then analyses the contents of the message and stores it (again, e.g., in a designated section of the message store 130, which may be a computer readable storage medium such as a non-volatile memory, hard disk, or the like) in vector representation form, denoted V(M). In one example, we use a bag of words representation model, whereby each position in the vector is associated with a word token, and the value at a given position in the vector represents the importance of the associated token within the message M. Importance can be measured in several different ways, including:

A. term frequency (tf): the number of times that the word token appears in the message; or B. tf-idf: term frequency multiplied by the inverse document frequency (i.e., the inverse of the rate of occurrence of the term across all documents in the corpus at hand).

When generating the representation V(M) of a given message, a service provider may choose to weight word tokens within a post title more strongly than words that occur in the post body. It is also often advisable to use normalized vectors when generating similarity scores between vectors. In the following, the symbol ^ is used to denote a vector that has been normalized.

In addition to analysing and storing the contents of new takeoff pages, the matching engine analyses and stores the contents of the pool of candidate templates, and the pool of candidate landing pages. As mentioned, the candidate landing pages are typically obtained by either receiving a content feed, making an API call or performing a crawl of one or more landing sites and the candidate creatives are typically generated either by hand or by a set of heuristics based on textual analysis of the respective takeoff and landing sites. The candidate templates and candidate landing pages are, like the messages on takeoff pages, represented in vector form based on a bag of words model, V(T) denoting the vector representation of template T, and V(L) denoting the vector representation of landing page L.

Given a particular message (or group of messages) M, candidate template T, and candidate landing page L, the matching engine 122 may, in one embodiment of the invention, calculate a textual similarity score as follows:

$$\text{Score\_textual} = V(M)\hat{\ } \cdot \{W\_T V(T)\hat{\ } + W\_L V(L)\hat{\ }\}\hat{\ }$$

The dot operator ("•") above denotes a simple pairwise dot product between the respective vector arguments. The weights W_T and W_L are adjustable weights defined by the service provider, which weights allow for emphasizing the relative importance of matching template text to a given takeoff page message over that of the landing page content by selecting W_T to be greater than W_L, for example.

With this scoring function in mind, an example of a process 300 for determining the best creatives to provide on a given takeoff site is illustrated in FIG. 3.

Initially, at 302, a pool of N(L) candidate landing pages L is specified. This pool may include some or all of the landing page URLs from landing page database 128. In the event fewer than all of the landing page URLs from the database are included in the pool, the subset of candidates may be stored separately or otherwise indicated through the use of appropriate flags in the database records.

At 304, a pool of N(T) of candidate templates T that are relevant in some way to the landing pages is determined. This may be done by manual or computational analysis of the landing and/or takeoff pages, as specified above. This pool may include some or all of the candidates from templates database 126. In the event fewer than all of the templates from the database are included in the pool, the subset of candidates may be stored separately or otherwise indicated through the use of appropriate flags in the database records.

Next, the matching engine (or a separate creative formation engine) constructs a set of N(T)*N(L) candidate creatives 306. Each creative consists of the text for template T and the URL for landing page L, i.e., the information to be displayed on a takeoff page.

For any given takeoff message, M, obtained by the matching engine 308, the set of N(T)*N(L) creatives are ranked against message M using the Score_textual formula described above 310. The matching engine discards all but the top, "p", creatives in the ranking, where p is an operator-defined threshold (e.g., m=20, etc.) 312. These p creatives are passed to a decision engine 124.

From the top p creatives, the decision engine selects "q" creatives to be displayed at the takeoff site 314, where q may be a service provider-defined parameter, e.g., 1 or more, or may be determined dynamically by the decision engine. The decision about how many creatives to display may be based on a number of criteria and may result in no creatives being displayed for a given takeoff message M. For example, in making such determinations the decision engine may be configured to take into account factors such as information delivered from the landing page, payload constituents other than the creative, and/or conversational statistics regarding the takeoff page, etc. Conversational statistics of this nature may include information regarding how frequently the conversation is being updated, the last time the conversation was updated, the results attributable to previously displayed creatives, and so on.

If creatives are to be provided for display, the decision engine passes the q creatives (or links to same) to the subject takeoff site, where the q creatives are displayed near (i.e., in a contextually relevant location for) takeoff message M 316. For example, the creatives may be displayed next in order in the conversation thread or may be displayed alongside the conversation thread so as not to be disruptive thereto. This may be accomplished through the use of instructions included with the creative in the payload, code injected into the takeoff page, or by code in a software application, which code or instructions direct the placement of the creatives from server 120. The process continues for further takeoff page messages 318 or quits 320, according to service provider instruction, number of iterations per takeoff site, or other indicator.

The present invention thus determines for a given message (or group of messages) in a conversation (e.g., an on-line conversation presented at a takeoff page), a best-available combination of a template and suitable landing page whose contents, taken together, match (or are most contextually relevant for) the contents of that message (or group of messages). If there is a sufficiently strong match, that template and the URL of the landing page (or links to same) are provided for display on the takeoff page (e.g., in a contextually relevant location with respect to the takeoff message), thereby providing a recommendation to the people engaged in or monitoring the conversation of additional content that can enhance their conversational experience.

The matching procedure described above provides a method for selecting relevant creatives based on textual data available from the takeoff page(s), templates and landing page(s). This process may be enhanced to take into account other information, for example feedback available from usage logs that track user interaction with the creatives, such as mouseovers or clicks, and/or subsequent user actions, such as product purchases or page visits within a landing site. That is, an adaptive component which takes into account user behavior can be added to the above-described matching procedure by, for example, altering the score of a given landing page depending on the clickthrough response a creative has received in the past, user behavior at the landing site, or other user behavior of interest.

Further, the process of building templates may lead to pools of templates that are strongly related by a common thematic element. Consider for example the following templates:

A. For more information on type II diabetes, please look at the following site . . .
B. You might find more about type II diabetes at . . .
C. Following up on your concern about type II diabetes, you could be interested in . . . .

The theme "type II diabetes" is common to all three of the creatives above. As noted above, any set of creatives that all contain a specified common theme may be regarded as an example of a variation set. If the pool of creatives supports non-trivial variation sets, the creatives comprising that variation set (or a subset thereof) may be incorporated into the criteria for selecting the top p creatives for consideration or the final q creatives to be provided for display. For example, the scoring function described above can be modified as follows:

$$\text{Score\_overall} = \text{Score\_textual} + \ln(\text{Clicks\_}L + e) + \ln(\text{Clicks\_}B)$$

where Clicks_L is the number of times that creative L has been selected (e.g., the URL within creative L has been selected) by users, and Clicks_B is the number of times that the creatives other than L but within the same variation set B as creative L have been selected by users. In some cases, only representative creatives from any given variation set potentially provides an enhanced user experience through creative diversification. Hence, it may be desirable to limit the number of creatives to be displayed from any given variation set for a given message instance.

In addition to the similarity measures and click-based measures discussed above, other criteria can also be used to provide augmented rules for triggering the presentation of one or more creatives against a given takeoff message. These include the overall sentiment of the message, and the type of speech act that it represents (e.g., a questions vs. a statement, etc.).

The foregoing discussion highlights the ability of the present system to provide system operators with "conversational strategies"—that is, strategies for content insertions in conversations. For example, recall that in the construction of a creative there are a number of "slots" that can be filled. If we regard the "theme" as one such slot, then for a fixed theme, the content of the other creative slots can be permitted to vary and the set of results will be thematically invariant, but otherwise distinct creatives. Different ones of these creatives can then be used within one or more conversational contexts and the results monitored to determine which is the best set of creative content for the defined theme. Stated differently, the present infrastructure allows a determination of a solution to the question, which creative content is best for a given theme.

Other problem constructs may involve determining the best time to insert a creative into a conversation. For example, analysis of the results of inserting creatives into conversations of varying conversational velocity (or into one conversation under conditions of different conversational velocity) may reveal information that allows service providers to chose optimum or near optimum times to insert future creatives so as to maximize the likelihood that URLs associated with those creatives will be selected by participants in the conversation.

The sum of the results from these kinds of learning instances (facilitated by the above-described infrastructure) gives rise to conversational strategies. Stated differently, the present invention provides means for determining what theme to match with what creative content, when best to insert creatives in a conversation, and a host of other information relative to deciding which content to insert in which conversations and when. Such decision means are embodied in the two step process that matches creatives and the content from takeoff pages and then creatives plus takeoff pages with appropriate landing pages.

Figure 4:
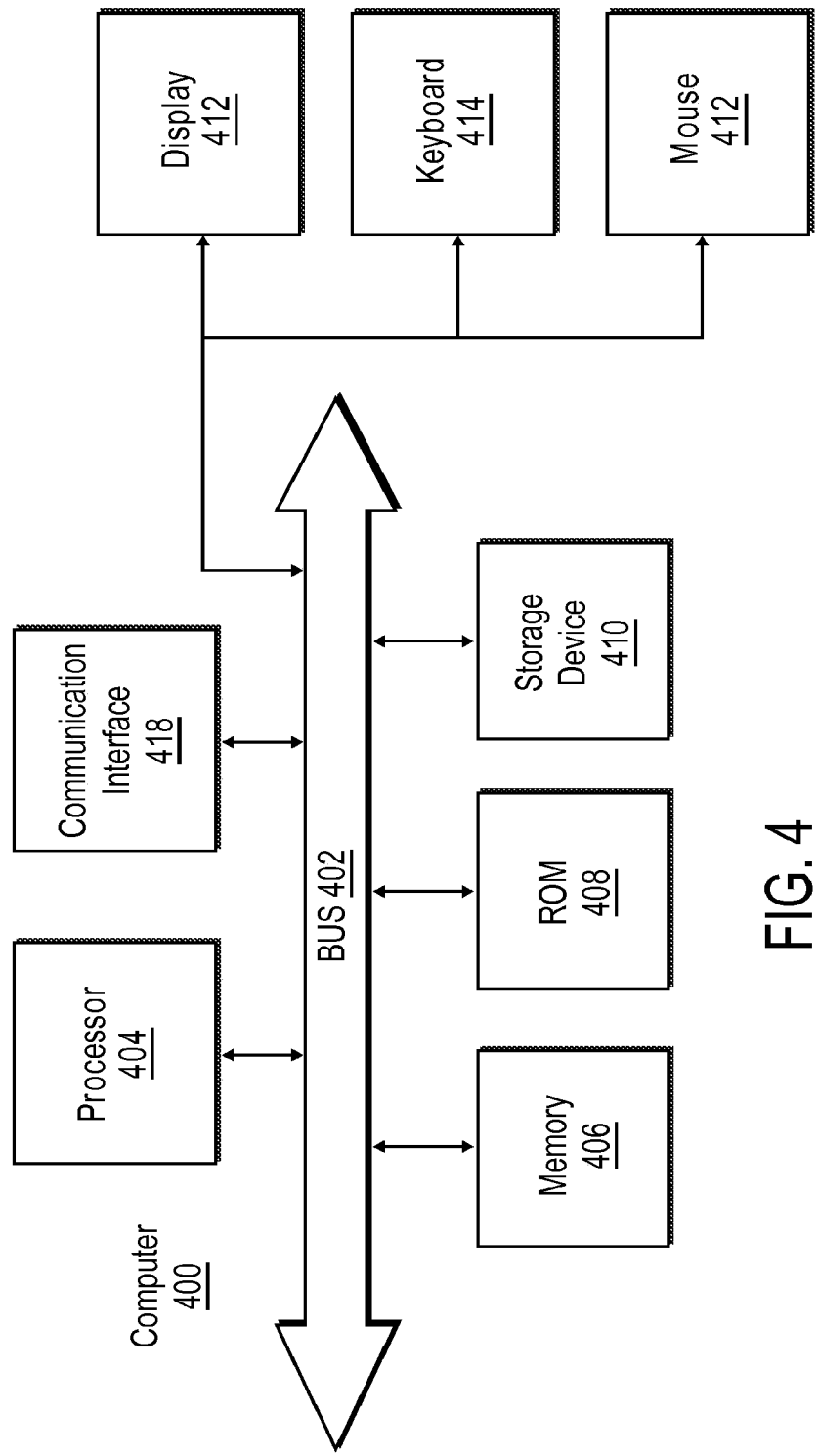
FIG. 4 illustrates a components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 4 provides an example of a computer system 400 that is representative of any of the servers or client systems discussed herein. Note, not all of the various computer systems may have all of the features of computer system 400. For example, certain of the servers discussed above may not include a display inasmuch as the display function may be provided by a client computer communicatively coupled to the server. Such details are not critical to the present invention. Computer systems such as computer system 400 may be referred to by other names, for example as hand-held devices, mobile devices, smart phones, multiprocessor systems, microprocessor-based electronic devices, digital signal processor-based devices, networked computer systems, minicomputers, mainframe computers, personal computers, servers, laptop computers, tablet computers, and the like. Such labels are not critical to the present invention.

Computer system 400 includes a bus 402 or other communication mechanism for communicating information, and a processor 404 coupled with the bus 402 for processing information. Computer system 400 also includes a main memory 406, such as a random access memory (RAM) or other dynamic storage device, coupled to the bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to the bus 402 for storing static information and instructions for the processor 404. A storage device 410, which may be one or more of a floppy disk, a flexible disk, a hard disk, flash memory-based storage medium, magnetic tape or other magnetic storage medium, a compact disk (CD)-ROM, a digital versatile disk (DVD)-ROM, or other optical storage medium, or any other storage medium from which processor 404 can read, is provided and coupled to the bus 402 for storing information and instructions (e.g., operating systems, applications programs and the like).

Computer system 400 may be coupled via the bus 402 to a display 412, such as a flat panel display, for displaying information to a computer user. An input device 414, such as a keyboard including alphanumeric and other keys, is coupled to the bus 402 for communicating information and command selections to the processor 404. Another type of user input device is cursor control device 416, such as a mouse, a trackball, or cursor direction keys for communicating direction information and command selections to processor 404 and for controlling cursor movement on the display 412. Other user interface devices, such as microphones, speakers, etc. are not shown in detail but may be involved with the receipt of user input and/or presentation of output.

The processes referred to herein may be implemented by processor 404 executing appropriate sequences of computer-readable instructions contained in main memory 406. Such instructions may be read into main memory 406 from another computer-readable medium, such as storage device 410, and execution of the sequences of instructions contained in the main memory 406 causes the processor 404 to perform the associated actions. In alternative embodiments, hard-wired circuitry or firmware-controlled processing units (e.g., field programmable gate arrays) may be used in place of or in combination with processor 404 and its associated computer software instructions to implement the invention. The computer-readable instructions may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 400 or similar electronic computing device, that manipulates and transforms data represented as physical (electronic) quantities within its registers and memories into other data similarly represented as physical quantities within its memories or registers or other such information storage, transmission or display devices.

Computer system 400 also includes a communication interface 418 coupled to the bus 202. Communication interface 418 provides a two-way data communication channel with a computer network, such as network 130 in FIG. 1, which provides connectivity to and among the various servers discussed above. For example, communication interface 418 may be a local area network (LAN) card to provide a data communication connection to a compatible LAN, which itself is communicatively coupled to the Internet through one or more Internet service provider networks. The precise details of such communication paths are not critical to the present invention. What is important is that computer system 400 can send and receive messages and data through the communication interface 418 and in that way communication with hosts accessible via the Internet.

The various databases described herein are computer-based record keeping systems. Stated differently, these databases are each a combination of computer hardware and software that acts together to allow for the storage and retrieval of information (data). Accordingly, they may resemble computer system 400, and are often characterized by having storage mediums capable of accommodating significant amounts of information.

Figure 5:
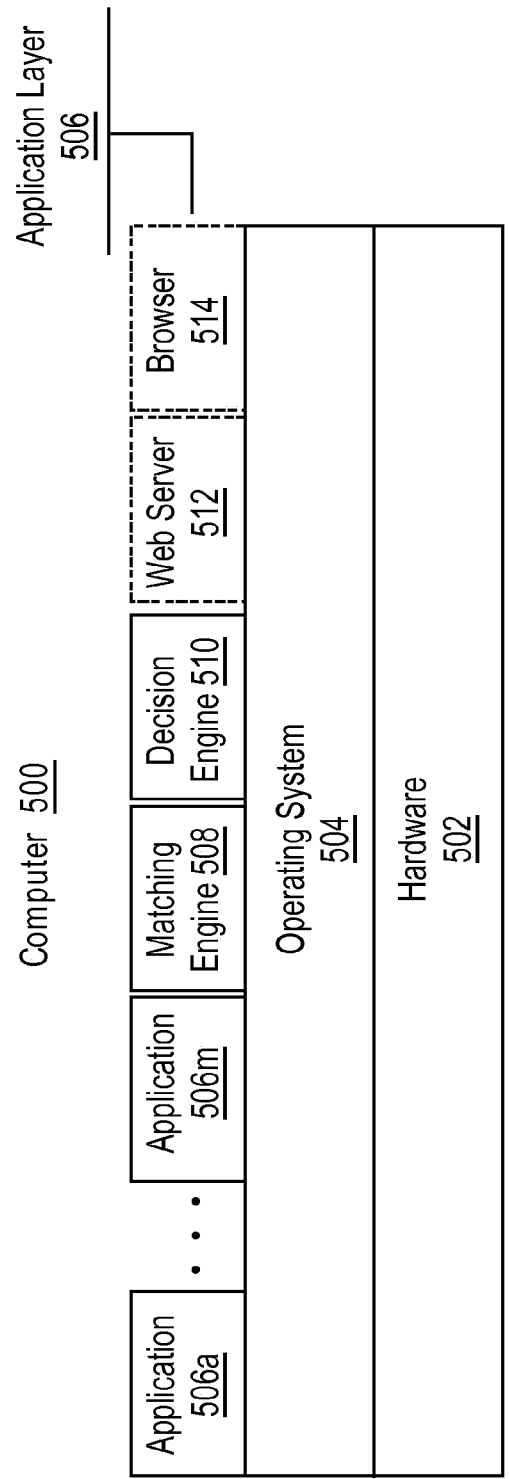
FIG. 5 illustrates a software architecture for various ones of the computer systems illustrated in FIG. 1.

FIG. 5 illustrates a computer system 500 from the point of view of its software architecture. Computer system 500 may be server 120 referred to above or, with appropriate applications comprising a software application layer 504, may be a client system or one of the host servers for a takeoff and/or landing site.

The various hardware components of computer system 500 are represented as a hardware layer 502. An operating system 504 abstracts the hardware layer and acts as a host for various applications 506a-506m, that run on computer system 500. In the case of server 120, the operating system acts as a host for a matching engine 508 and decision engine 510, which are configured to perform the processes described above to provide ad insertions. For a server 102 and/or 108, the operating system may host a web server application 512, which provides access from the client computers via web browsers. Such a web server may also be hosted on server 120 to provide an interface by which the host servers 102 and 108 may communicate with server 120. In the case of a client system, the operating system acts as a host for a Web browser application 514, but not a matching engine, decision engine or (typically) a web server 512.

As alluded to above, network 130 may include the Internet and the various servers and client computers communicatively coupled thereto may include computer systems, such as computer system 400, that are made up of one or more processors, associated memory (typically volatile and non-volatile) and other storage devices and peripherals that allow for connection to the Internet or other networks. The precise hardware configuration of the hosting and client resources is generally not critical to the present invention, nor are the precise algorithms used to implement the services and methods described herein. Instead, the focus is on the nature of the services provided by the present invention.

Insofar as the foregoing discussion concerns domains, URLs, links, and the like, it should help to understand that in order to facilitate communications between hosts on the Internet, each host has a numerical Internet protocol (IP) address and a unique fully qualified domain name. In the case of the hypothetical host with an IP address of 123.456.78.91, the fully qualified domain name might be "computer.domain.com". In its most generic form, a fully qualified domain name consists of three elements: a hostname ("computer"), a domain name ("domain") and a top level domain ("com"). A given host looks up the IP addresses of other hosts on the Internet through a system known as domain name service. If an Internet user desires to establish a connection with a Web page hosted at computer.domain.com, the Internet user might enter into a Web browser program a URL that includes the domain name and domain of the host, e.g., "http: www.domain.com", where the first element of the URL is a transfer protocol (most commonly, "http" standing for hypertext transfer protocol), "www" standing for the World Wide Web and "domain.com" (collectively, these elements other than the transfer protocol are an alias for the fully qualified domain name of the host computer.domain.com). Once a URL is entered into the browser, the domain name service matches it to and provides the corresponding IP address 123.456.78.91, allowing the browser to contact the desired host. Hyperlinks or links are then specially encoded portions of a web page (often a name or other text) that include a reference to a host by way of such aliases or IP addresses.

Thus, methods and systems for inserting appropriate links into an ongoing conversation, which links point to other material that users engaged in the conversation might find helpful and relevant to the conversation, have been described. The matching function provided by the present invention uses as inputs models of content from a landing page, a creative (the message to be inserted into a takeoff page), and content from the takeoff page. The models of these components can be words or other labels derived by other means including, but not limited to, speech act labels, entities or other special words, or contributor properties. The resulting match can be regarded as a two-part match involving a match between the creative and the content from the takeoff page and then the creative plus the takeoff page and the landing page. Weights control which match is emphasized in the final score. The matching process outputs a scored list of possible creatives for insertion in the takeoff page and a separate decision mechanism makes the final selection from that scored list. This decision process can take into account various factors such as campaign management requirements (e.g., creative exposure limits) and conversational statistics to decide whether to place a creative or which creative to deliver. Further, determining which, if any of the creatives to be displayed may include information about the devices on which the creative may be displayed. For example, screen size limit or text string length limit.

In various embodiments of the invention, the decision process may also incorporate learning based on past experiences with the creatives. For example, user interaction with previous instances of the creatives when inserted into takeoff pages may be tracked and used when deciding which, if any, creatives to provide for insertion. Moreover, such experience may be used in the matching process when deciding which introductions, calls to action and other components to combine with one another to form a creative. Likewise, past experience with creative placement within a takeoff page may be monitored by server 120 and used to aid the decision about when to insert a creative in a takeoff page. Further, features or metrics regarding the conversation, such as conversational velocity, may be monitored and used as a guide for deciding whether and when to insert creatives. Such functions may be incorporated in either the decision engine or matching engine as appropriate.

In the foregoing discussion, the focus has been on creating links to guide users from conversational content to curated content, but in general the present methods and systems may be employed to create and insert links between any content of different modes. So, for example, the present methods and systems can be used to deliver curated content to sites hosting conversational content. In this regard, curated content can be regarded broadly as any content under editorial control of a site operator, or even profiles of individuals (e.g., Web-based biographies or profiles commonly associated with social networking sites or service provider sites). For example, links to such profiles may be used to suggest certain people (e.g., a subject matter expert) to join a conversation or answer a question, or even the reverse, i.e., suggest that a person join a particular conversation because he/she would provide information of value to that conversation. Thus, the referral process afforded by the present invention operates in a direction from conversation to curated (a takeoff page hosting conversational content to a landing page hosting curated content, or vice-versa. Indeed, one could use the present methods for mapping conversations to conversations, for example across on-line communities.

Given the various instances in which the present systems and methods find application, it should be recognized that the examples presented in the foregoing description were provided merely for purposes of illustration and should not be read as unduly limiting the present invention.

What is claimed is:

1. A computer-implemented method comprising:
identifying, by a processor, first text content on a first conversation medium;
identifying, by the processor, a plurality of available templates, each of the plurality of available templates including second text content;
identifying, by the processor, a plurality of available target sites, each of the plurality of available target sites including third text content;
identifying, by the processor, a first combination including a first template of the available templates, and a first target site of the available target sites;
identifying, by the processor, a second combination including a second template of the available templates, and a second target site of the available target sites;
determining, by the processor, a first score based on a comparison of the second and third text contents of the first combination, against the first text content of the conversation;
determining, by the processor, a second score based on a comparison of the second and third text contents of the second combination, against the first text content of the conversation;
selecting, by the processor, one of the first or second combinations based on the first and second scores; and
providing, by the processor, in the first conversation medium, the second text of a selected template of the first and second templates corresponding to the selected combination, and a link to a selected target site of the first and second target sites corresponding to the selected combination.

2. The method of claim 1, wherein the conversation medium is at least one of a web page, blog, social network site, or chat window.

3. The method of claim 1, wherein the first and second scores are indicative of contextual relevance of the second and third text contents of respectively the first and second combinations, to the first text content of the conversation.

4. The method of claim 1, wherein the first and second scores are based on click through response of respectively first and second links to respectively the first and second target sites, or user interactions at respectively the first and second target sites.

5. The method of claim 1, wherein the selected template identifies positions for inserting the second text content or the link.

6. The method of claim 1, wherein the selected target site provides information relevant to the first text content.

7. The method of claim 1, wherein the selected target site is an online site hosting conversational content relevant to the first text content.

8. The method of claim 1, wherein the first text content is one or more messages exchanged during a chat conversation.

9. The method of claim 1, wherein the second text content of the selected template includes at least one of introductory words, themes, or prompts to take action.

10. The method of claim 1, wherein the second text content of the selected template and the link to the selected site are displayed in a location determined by the selected template.

11. A system comprising:
a processor; and a memory, wherein the memory stores instructions that, when executed by the processor, cause the processor to:
  identify first text content on a first conversation medium;
  identify a plurality of available templates, each of the plurality of available templates including second text content;
  identify a plurality of available target sites, each of the plurality of available target sites including third text content;
  identify a first combination including a first template of the available templates, and a first target site of the available target sites;
  identify a second combination including a second template of the available templates, and a second target site of the available target sites;
  determine a first score based on a comparison of the second and third text contents of the first combination, against the first text content of the conversation;
  determine a second score based on a comparison of the second and third text contents of the second combination, against the first text content of the conversation;
  select one of the first or second combinations based on the first and second scores; and
  provide the second text of a selected template of the first and second templates corresponding to the selected combination, and a link to a selected target site of the first and second target sites corresponding to the selected combination, in the first conversation medium.

12. The system of claim 11, wherein the conversation medium is at least one of a web page, blog, social network site, or chat window.

13. The system of claim 11, wherein the first and second scores are indicative of contextual relevance of the second and third text contents of respectively the first and second combinations, to the first text content of the conversation.

14. The system of claim 11, wherein the first and second scores are based on click through response of respectively first and second links to respectively the first and second target sites, or user interactions at respectively the first and second target sites.

15. The system of claim 11, wherein the selected template identifies positions for inserting the second text content or the link.

16. The system of claim 11, wherein the selected target site provides information relevant to the first text content.

17. The system of claim 11, wherein the selected target site is an online site hosting conversational content relevant to the first text content.

18. The system of claim 11, wherein the first text content is one or more messages exchanged during a chat conversation.

19. The system of claim 11, wherein the second text content of the selected template includes at least one of introductory words, themes, or prompts to take action.

20. The system of claim 11, wherein the second text content of the selected template and the link to the selected site are displayed in a location determined by the selected template.

* * * * *